United States Patent [19]

Fujinami

[11] 3,733,557

[45] May 15, 1973

[54] DEVICE FOR DETECTING RATE OF CHANGE IN VOLTAGE

[75] Inventor: Hiroshi Fujinami, Kariya, Japan

[73] Assignee: Nippondenso Co., Ltd., Kariya-shi, Aichi-ken, Japan

[22] Filed: Sept. 10, 1971

[21] Appl. No.: 179,429

[30] Foreign Application Priority Data

Nov. 27, 1970 Japan ..................45/104983

[52] U.S. Cl. ..........328/132, 303/21 BE, 303/21 CG, 324/162, 328/148, 328/175
[51] Int. Cl. ......G01p 15/08, B60t 8/08, H03k 5/153
[58] Field of Search ................303/21 BE, 21 EB, 303/21 CE, 21 CF, 21 CG; 317/5; 324/162; 328/127, 128, 132, 146, 147, 148, 175; 330/30 D

[56] References Cited

UNITED STATES PATENTS

| | | |
|---|---|---|
| 3,547,501 | 12/1970 | Harned et al.....................303/21 BE |
| 3,604,762 | 9/1971 | Ando..........................303/21 BE UX |
| 3,606,490 | 9/1971 | Ando..............................303/21 CG |
| 3,622,208 | 11/1971 | Krugler, Jr.......................303/21 BE |

Primary Examiner—John S. Heyman
Assistant Examiner—L. N. Anagnos
Attorney—Cushman, Darby & Cushman

[57] ABSTRACT

When the difference between a voltage representative of a reference velocity which gradually falls off at a rate determined by an integrating constant and a voltage proportional to the rotating velocity of a rotating body, becomes greater than a predetermined value, the reference velocity voltage is made to approach the rotational velocity proportional voltage by rendering the integrating constant small. Thereby, the time during which a spurious signal indicating a deceleration is developed though the rotating body is actually accelerating, can be shortened to such a considerable extent that no undesireable effects are incurred in practical operation.

2 Claims, 4 Drawing Figures

DEVICE FOR DETECTING RATE OF CHANGE IN VOLTAGE

BACKGROUND OF THE INVENTION

1. Field of the Invention

This invention relates to a device, for example, for detecting a deceleration of a vehicle by detecting an electric quantity converted from the deceleration.

2. Description of the Prior Art

Conventionally, the deceleration of a vehicle was detected by converting the number of rotations or rotational velocity of the wheel(s) of the vehicle into d.c. voltage. According to the prior art method, the conduction and non-conduction of a transistor is effectively utilized. Namely, when a vehicle is accelerating or travelling at a constant velocity, a capacitor is charged with the converted d.c. voltage which capacitor is connected between the base and the emitter of a transistor so that the transistor, forward biased, will conduct. On the other hand, when the vehicle is decelerating, the capacitor is discharged to lower the base potential of the transistor (to supply a reverse bias voltage between the base and the emitter) so that the transistor will be cut off. That is, the deceleration of the vehicle is detected by cutting off the transistor when the deceleration exceeds a predetermined level.

The prior art device made according to the above described principle will next be described in further detail taken in conjunction with the characteristic curves in FIG. 1 of the attached drawings. In FIG. 1, the abscissa represents time $t$(sec.) and the ordinate has as its unit voltage $V$(volt), and the curve of solid line corresponds to a d.c. voltage $V_w$ proportional to the number of the wheel rotations while the curve of dotted line represents a terminal voltage $V_c$ across the capacitor. If a braking force is applied to the wheel at time $t_1$ and the vehicle decelerates, then the capacitor starts discharging. And the transistor will be cut off as soon as the time $t_2$ is reached when the terminal voltage $V_c$ across the capacitor gets lower than a predetermined level $V_1$. If the braking force applied to the wheel is now released at time $t_3$ and the vehicle is abruptly accelerated, then voltages $V_w$ and $V_c$ begin to increase. However, in this case, although the vehicle is accelerating, the transistor remains cut off until the time $t_4$ is reached when the terminal voltage $V_c$ becomes equal to the predetermined level $V_1$. Thus, an erroneous indication that the vehicle is decelerating will be given because the transistor remains cut off between the times $t_3$ and $t_4$ even if the vehicle is actually accelerating. This erroneous indication is one of the serious disadvantages of the prior art device.

SUMMARY OF THE INVENTION

The object of the present invention is to provide a means for detecting the rate of change in voltage, comprising an integrator to generate a voltage representative of a reference velocity which gradually falls off at a rate determined by the integration constant of the integrator; a first comparator to compare the reference velocity voltage from the integrator with a voltage which is proportional to the rotating velocity of a rotating body, to produce an output signal when the second mentioned voltage is higher than the first mentioned voltage, and to apply a negative feedback to the integrator in response to the output signal; and a second comparator to reduce the integration constant when the difference between the first and second mentioned voltages is greater than a predetermined value and thereby to make the first mentioned voltage approach the second mentioned voltage.

According to the present invention, when the difference between the voltage representative of the reference velocity and the velocity voltage proportional to the rotating velocity of the rotating body exceeds the predetermined value, the integration constant is reduced so that the reference velocity voltage may be made to approach the velocity proportional voltage. Hence, the time during which a spurious signal representing a deceleration is developed though the wheel of a vehicle is under acceleration or during which a spurious signal representing an acceleration is developed though the wheel is under deceleration, can be shortened to a considerable extent with the device made according to the present invention in comparison with the case where the prior art detector is used. And the smaller the voltage difference, the still shorter is the time. Therefore, the time can be made as small as where no practical inconvenience is incurred. Thus, the device of the present invention is advantageously useful especially in preventing a vehicle from colliding with another by detecting the deceleration or acceleration of the vehicle.

DESCRIPTION OF THE PREFERED EMBODIMENT
terminal

Figure 1:
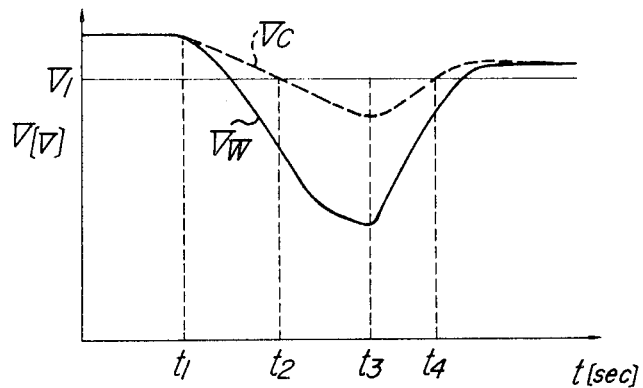
FIG. 1 shows voltage wave forms for illustrating the operation of the conventional, well-known device for detecting the rate of change in voltage.
Figure 2:
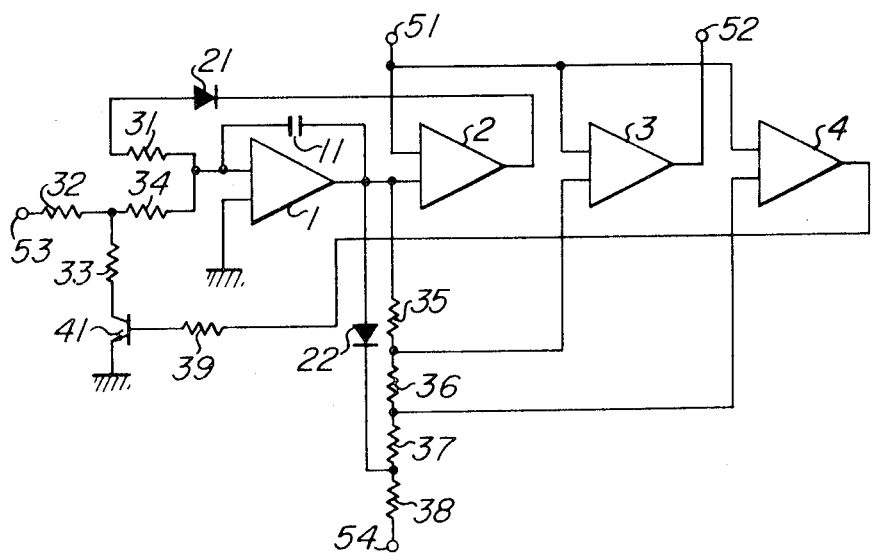
FIG. 2 is the electric circuit diagram of one embodiment of the present invention, that is, a device for detecting the rate of change in voltage.

The present invention will hereinafter be described as applied to detect the deceleration of a vehicle. Reference should now be made to FIG. 2 in which the circuit diagram of one embodiment of the present invention is shown. To a terminal 51 is applied a voltage $V_w$ proportional to the rotational velocity of the wheel of a vehicle. This voltage $V_w$ may be, for example, obtained through rectification and filtration of the output from an a.c. generator whose rotor axis is mechanically connected with the axis of the wheel of the vehicle. A constant positive voltage from a suitable source is applied to a terminal 53, while a constant negative voltage from a suitable source is applied to a terminal 54. Numerals 1 and 2 indicate operational amplifiers and numerals 3 and 4 designate comparison amplifiers. The operational amplifier 1, with a capacitor 11 connected between the output and the inverted input thereof, constitutes an integrator. The inverted input is also connected through the series circuit of resistor 32 and a resistor 34 to the terminal 53 to which a constant positive voltage is applied. Moreover, the same inverted input is connected via a resistor 31 and a diode 21 to the output of the operational amplifier 2. The non-inverted input of the operational amplifier is grounded. The junction point of the resistors 32 and 34 is connected via a resistor 33 to the collector of a transistor 41 and the emitter of the transistor 41 is grounded. The terminal 51 to which is applied a voltage proportional to the rotational velocity of the wheel of the vehicle, is connected not only with the inverted input of the operational amplifier 2 but also with the inverted input of the comparison amplifier 3 and the non-inverted input of the comparison amplifier 4. The output of the operational amplifier 1 is connected not only with the non-inverted input of the operational amplifier 2 but also with one end of a resistor 35 and the anode of a diode 22. The other end of the resistor 35 is connected with one end of a resistor 36 and the non-inverted input of the comparison amplifier 3. The other end of the resistor 36 is connected with one end of a resistor 37 and the inverted input of the comparison amplifier 4. The other end of the resistor 37 is connected with the cathode of the diode 22 as well as one end of a resistor 38 of which the other end forms the terminal 54 to which a constant negative voltage is applied. The output of the comparison amplifier 4 is connected with the base of the transistor 41 via a resistor 39. The overall output of the device according to the present invention is derived at the output of the comparison amplifier 3, i.e. a terminal 52. A signal "1" appears at the terminal 52 only when the vehicle is decelerating while otherwise a signal "0" appears at the terminal 52.

Figure 3:
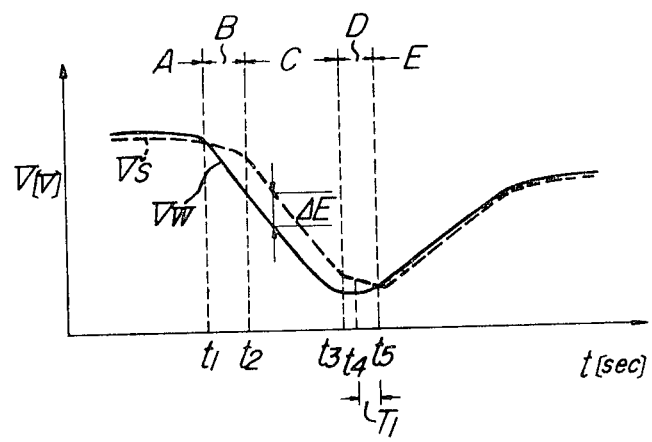
FIG. 3 shows voltage wave forms for illustrating the operation of the device according to the present invention.

The operation of the device according to the present invention with such a construction as described above will next be explained taken in conjunction with FIG. 3 of the attached drawings. In FIG. 3, the abscissa of the coordinate system is graduated in time $t$(sec.) and the ordinate in voltage V(volt). Symbols $V_w$ and $V_s$ designate a voltage proportional to the rotational velocity of the wheel of the vehicle and a voltage representative of the reference rotational velocity of the wheel, that is, the reference velocity of the vehicle, derived at the output of the operational amplifier 1, respectively. Now, when the vehicle is travelling at a constant velocity, that is, the region A before the time $t_1$ in FIG. 3 is taken into consideration, the voltage $V_s$ representative of the reference velocity which voltage is the output of the integrator consisting of the operational amplifier 1 and the capacitor 11 is applied to the non-inverted input of the operational amplifier 2. The operational amplifier 2 compares the voltage $V_s$ applied to the non-inverted input thereof with the voltage $V_w$ proportional to the rotational velocity of the wheel, that is, proportional to the velocity of the vehicle, applied to the inverted input thereof, and in response to the difference between these voltages $V_s$ and $V_w$ the amplifier 2 feeds its output back to the inverted input of the operational amplifier 1, i.e. the input of the integrator through the diode 21 and the resistor 31. Thus, a steady state is attained due to the establishment of a so-called self-control circuit. Meanwhile, the voltage $V_s$ derived at the output of the amplifier 1 before the time $t_1$ is lower by the offset voltage of the amplifier 2 than the voltage $V_w$. Moreover, by utilizing a forward voltage drop across the diode 22 and by means of the resistor 35, a voltage lower by the offset voltage of the comparison amplifier 3 than the voltage $V_s$ is applied to the non-inverted input of the amplifier 3 so that a signal "0" will appear at the output terminal 52. Meanwhile, to the inverted input of the comparison amplifier 4 is applied a voltage lower by $\Delta E$ (for example, 0.1 volts) than the voltage $V_s$ which voltage is produced with the diode 22 and the resistors 35 and 36, so that a signal "1" from the amplifier 4 causes the transistor 41 to conduct.

Next, when a braking force is applied to the wheel at the time $t_1$ to lower the rotational velocity of the wheel, and when the voltage $V_w$ proportional to the velocity of the vehicle is lower than the voltage $V_s$ representative of the reference velocity of the vehicle, as seen in the region B in FIG. 3, a signal "1" will appear at the output terminal 52 of the comparison amplifier 3 and it will be detected that the vehicle is decelerating. The decreasing gradient of the voltage $V_s$ is determined by the integration constant dependent on a voltage available at the junction point of the resistors 32 and 33 serving as a voltage divider. In this case, the integrating resistor of the integrator consisting of the operational amplifier 1 and the capacitor 11 is the resistor 34, and the integrating capacitor is the capacitor 11. Since in the amplifier 2 the voltage $V_w$ is lower than the voltage $V_s$, the output of the amplifier 2 is of a positive voltage. Therefore, due to the function of the diode 21, the operational amplifier 2 is electrically separated from the input of the integrator, and a signal "1" is obtained at the output 52 of the comparison amplifier 3.

When, in the region C after the time $t_2$, the difference between the voltages $V_s$ and $V_w$ becomes greater than $\Delta E$, the state of the amplifier 4 is inverted and it puts out a signal "0" to cut off the transistor 41. Consequently, the constant positive voltage applied to the terminal 53 is applied to the input of the integrator consisting of the operational amplifier 1 and the capacitor 11. Now, the voltage $V_s$ representative of the reference velocity of the vehicle is make to abruptly approach the voltage $V_w$ proportional to the velocity of the vehicle because since the input resistor of the integrator is now the combination of the series connected resistors 32 and 34, the integration constant is rendered smaller. Thereafter, when the difference between the voltages $V_s$ and $V_w$ becomes smaller than $\Delta E$ at the time $t_3$, the comparison amplifier 4 is reset to its initial state to put out a signal "1" at its output terminal. Accordingly, the transistor 41 resumes conduction so that the integration constant will return to its initial value. With this operation as described above, the difference between the voltages $V_s$ and $V_w$ is kept smaller than $\Delta E$. At this time, of course, a signal "1" will continue to appear at the output terminal 52.

The braking force being applied since the time $t_1$ is released at the time $t_4$ to accelerate the vehicle, as seen in the region D after the time $t_3$ in FIG. 3, and then the difference between the voltages $V_s$ and $V_w$ is smaller than $\Delta E$. Consequently, the transistor 41 is in its conductive state and the voltage $V_s$ representative of the reference vehicle velocity gradually falls off at the rate determined by the initial integration constant of the integrator. And, when the voltage $V_s$ falls off below the voltage $V_w$ at the time $t_5$ and then becomes equal to the offset voltage of the comparison amplifier 3 derived from the resistor 35, the output signal at the terminal 52 shifts from "1" to "0." Namely, the signal which appears at the terminal 52 assumes the value "1" only in the regions B, C, and D in FIG. 3.

In the region E after the time $t_5$, the vehicle is already accelerating and so the velocity proportional voltage $V_w$ exceeds the reference velocity voltage. Then, the potential at the inverted input of the operational amplifier 2 is higher than that at the non-inverted input of the amplifier 2 so that the output of the amplifier 2 will be negative. This negative output will change the input voltage to the integrator consisting of the arithmetic amplifier 1 and the capacitor 11. Accordingly, the reference velocity voltage $V_s$ abruptly approaches the velocity proportional voltage $V_w$, the resistor 31 being the input resistor for the integrator.

Thus, according to the device of the present invention, since the voltage $V_s$ is forcibly made to approach the voltage $V_w$ in the region C in FIG. 3, the time $T_1$ during which a spurious signal indicating that the vehicle is decelerating even after the time $t_4$ though it is actually accelerating is developed can be considerably shortened by setting $\Delta E$ sufficiently small.

Figure 4:
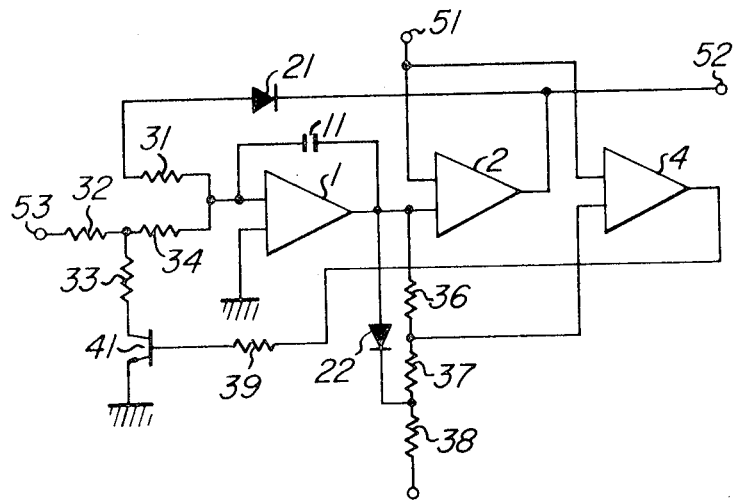
FIG. 4 is the electric circuit diagram of another embodiment of the present invention.

In the embodiment as shown in FIG. 2, in order to obtain a signal indicating deceleration, the comparison amplifier 3 is especially employed to steepen the rise and fall gradient of the signal. However, in case where such a stable circuit as an R-S flip-flop circuit is used as the input stage of a load to receive the signal indicating the deceleration, the amplifier 3 may be omitted and the signal may be put out directly from the output terminal of the operational amplifier 2, as seen in the embodiment shown in FIG. 4. In FIG. 4, circuit elements indicated by the same numerals as in FIG. 2 correspond to the same or equivalent circuit element and have the same functions.

The embodiments shown in FIGS. 2 and 4 are the devices for detecting the deceleration of the vehicle. It is also easily thought of by those skilled in the art that in order to detect the acceleration of the vehicle with the same circuits as shown in FIG. 2 or 4 a d.c. voltage which is inversely proportional to the rotational velocity of the wheel has only to be applied to the terminal 51 instead of the voltage $V_w$ proportional to the rotational velocity of the wheel in case of detecting the deceleration of the vehicle.

The application of the device made according to the invention whose operation is described above, will next be explained where it is used as an apparatus for detecting the deceleration of the wheel of an automobile to prevent automobiles from colliding with each other. In this case, it is desired to set the predetermined value for the measure to detect the deceleration near 0.25 m/s². On the other hand, deceleration experienced by the wheel of the vehicle in its normal operation will range from 2 to 4 m/s². If the deceleration in the normal operation of the automobile is greater than 10 times the predetermined value, as is the usual case, the prior art device cannot perform a stable operation, resulting in such a spurious indication as previously mentioned. According to the present invention, an accurate detection of the deceleration can be expected even in that case. Thus, the device according to the invention is specifically useful when used to detect the deceleration or acceleration of the wheel of a vehicle.

The device according to the present invention can also be applied to cases other than those described above. For example, the device can be combined with an automatic gear change for use in an automobile, that is, an electrically driven, automatic gear change in which along with a fluid torque converter an electromagnetic solenoid is used to change the gearing ratio in accordance with a gear change pattern selected from several patterns which have been prepared against various road conditions such as ascents or descents. In this case, the device is used to detect the deceleration and acceleration of the automobile for selecting the most suitable pattern. Therefore, an accurate automatic gear change is ensured regardless of inclination of the road. It is obvious that the present invention is not limited to the embodiments described above in serving as devices for detecting the deceleration or acceleration of the wheel of an automobile but that it can also be applied to detect the deceleration or acceleration of rotating bodies of other kinds. Moreover, the integrator consisting of the operational amplifier 1 and the capacitor 11 as used in the previously described embodiments may be replaced by a simple circuit comprising a combination of a resistor and a capacitor. Furthermore, a difference amplifier or a circuit comprising a combination of Zener diodes and transistors may be used instead of the operational amplifiers 1 and 2, or the comparison amplifiers 3 and 4, each used as a comparator in the embodiment described above.

I claim:

1. A device for detecting the rate of change in voltage, comprising: an integrator to generate a voltage representative of a reference velocity which is gradually decreased at a rate determined by the integration constant of said integrator; a first comparator to compare said reference velocity voltage put out of said integrator with a voltage proportional to the rotating velocity of a rotating body, to produce an output signal when said rotating velocity proportional voltage exceeds said reference velocity voltage, and to provide a negative feedback for said integrator in response to said output signal; and a second comparator which reduces said integration constant when the difference between said reference velocity voltage and said rotating velocity proportional voltage is greater than a predetermined value and which thereby causes said reference velocity voltage to approach said rotating velocity proportional voltage.

2. A device as claimed in claim 1, wherein said integrator is constituted of an operational amplifier and a capacitor.

* * * * *